July 18, 1967 W. HACHTEL 3,331,095
CURTAIN RAIL, PREFERABLY OF SYNTHETIC PLASTIC MATERIAL, HAVING
CURVED END SECTIONS
Filed July 15, 1964 7 Sheets-Sheet 3
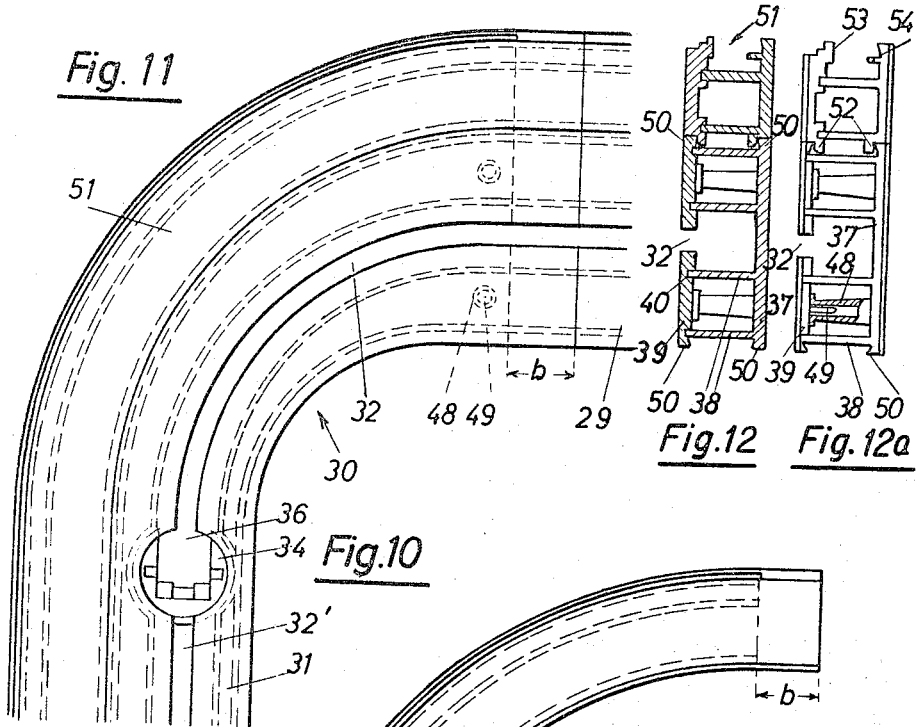
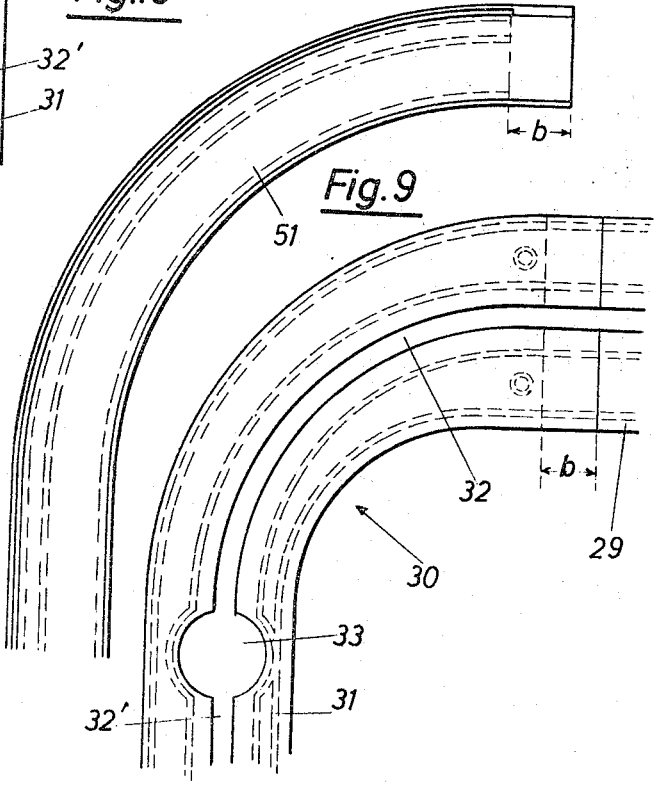
INVENTOR
WILHELM HACHTEL
BY Lowry & Rinehart
ATTORNEYS

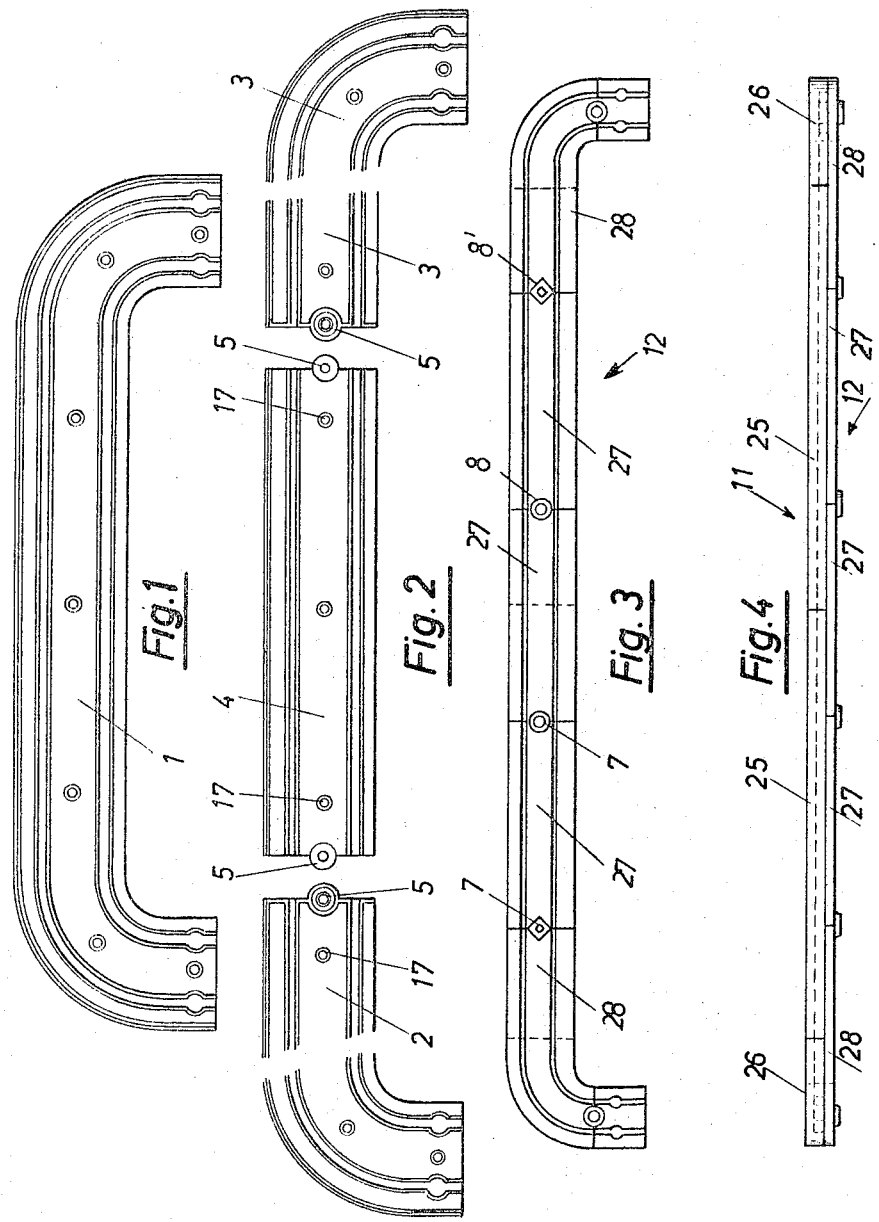

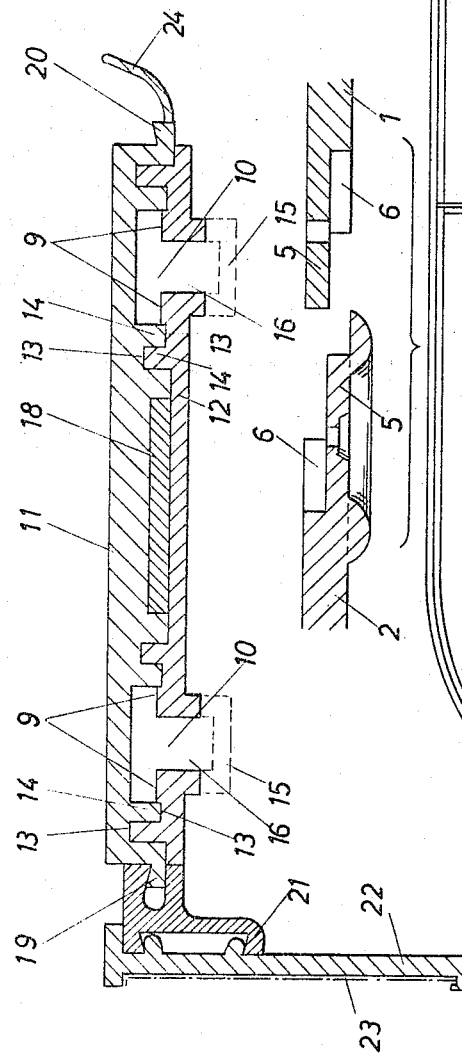

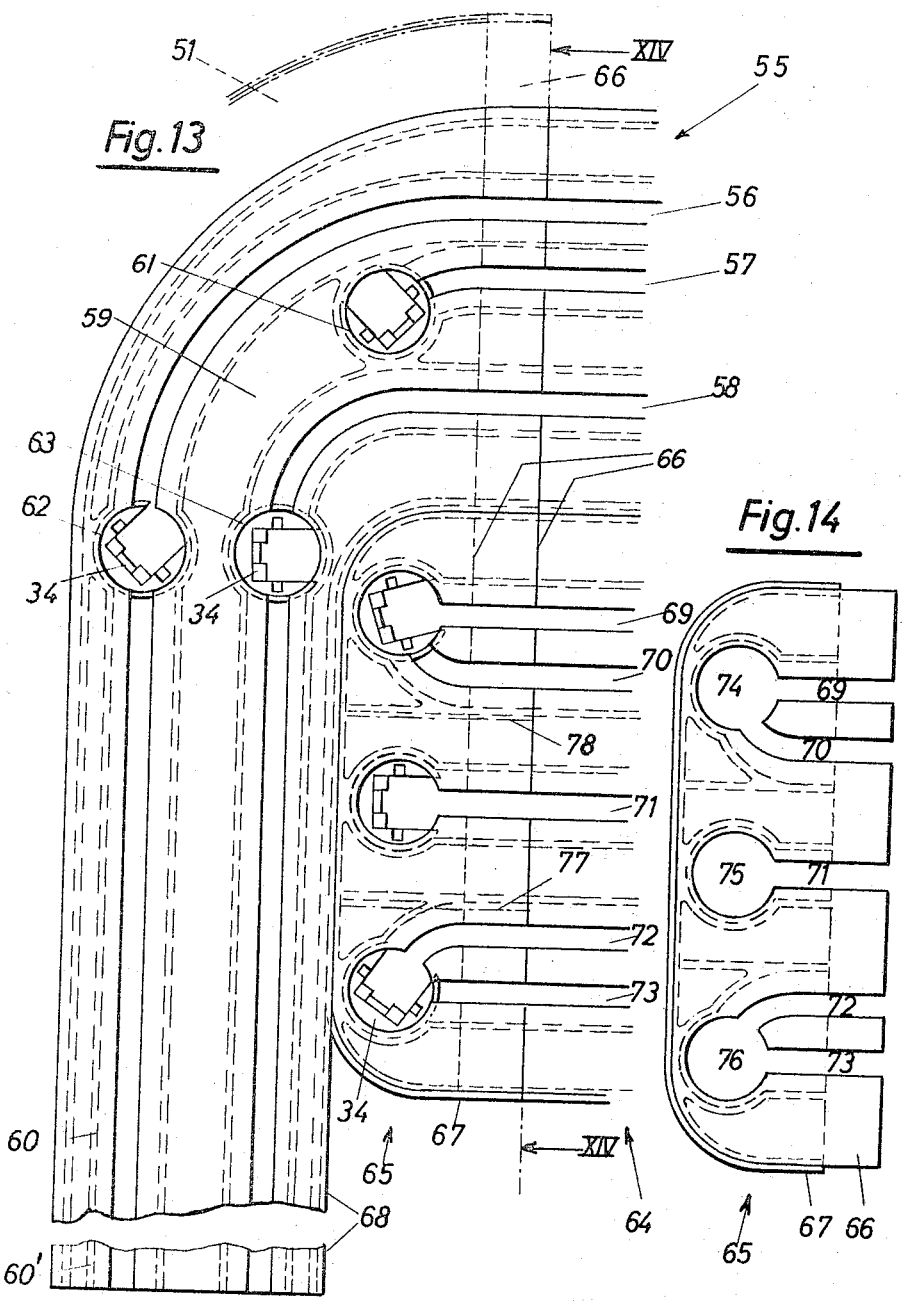

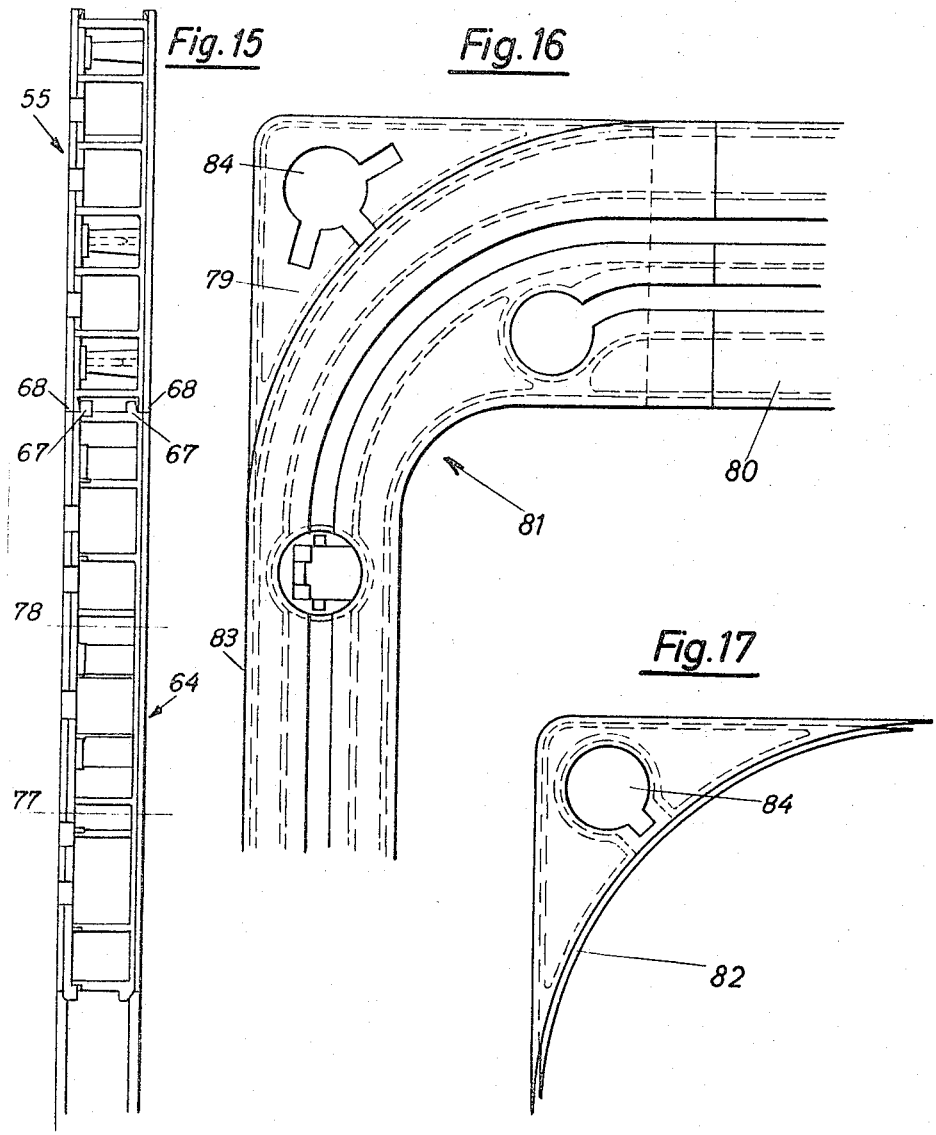

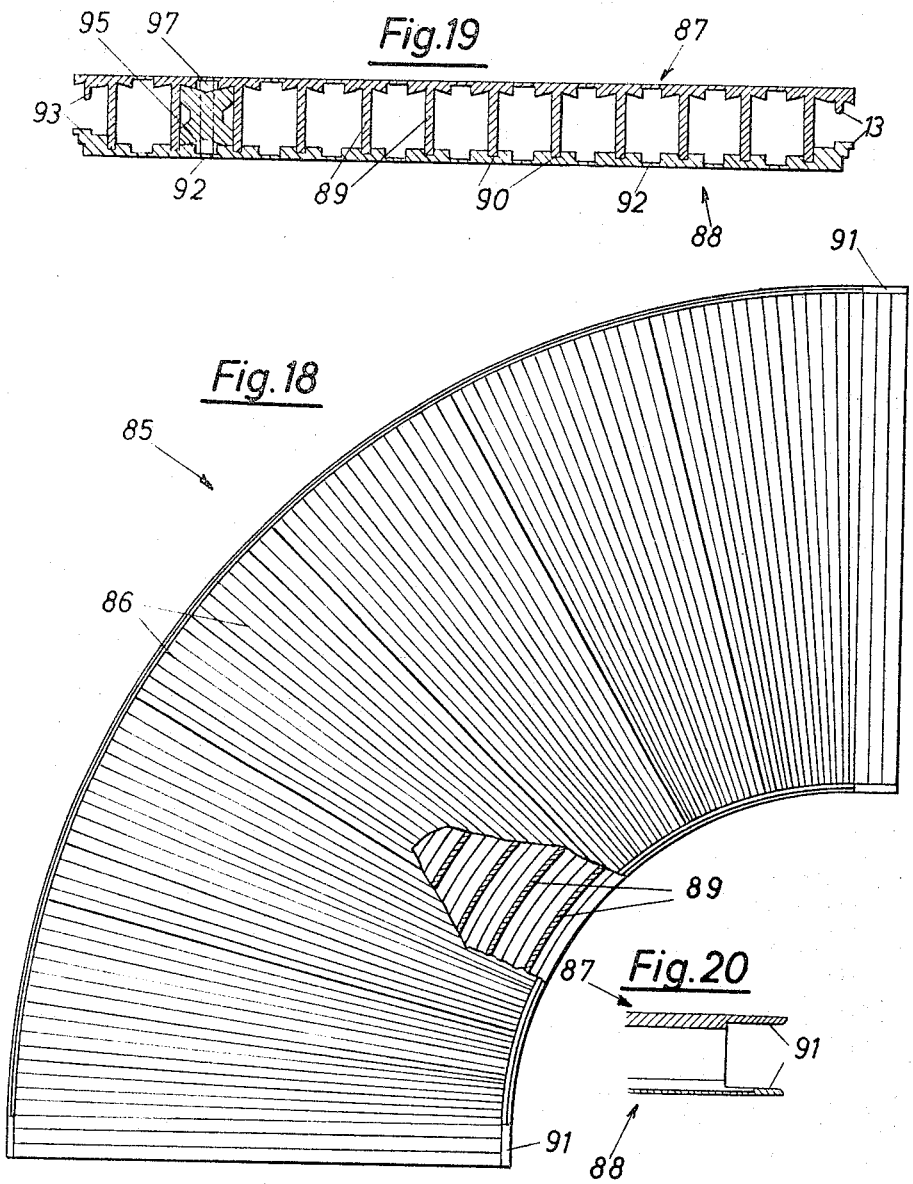

July 18, 1967 W. HACHTEL 3,331,095
CURTAIN RAIL, PREFERABLY OF SYNTHETIC PLASTIC MATERIAL, HAVING
CURVED END SECTIONS
Filed July 15, 1964 7 Sheets-Sheet 7
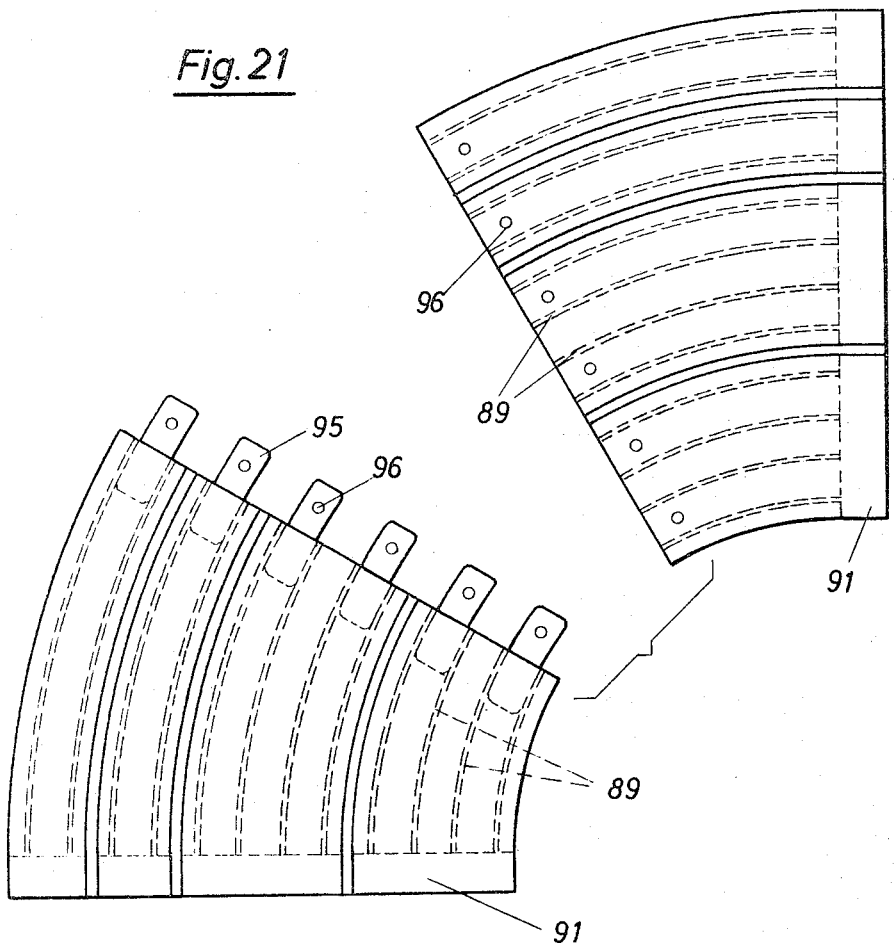
INVENTOR
WILHELM HACHTEL
BY Lowry & Rinehart
ATTORNEYS

United States Patent Office 3,331,095
Patented July 18, 1967

3,331,095
CURTAIN RAIL, PREFERABLY OF SYNTHETIC PLASTIC MATERIAL, HAVING CURVED END SECTIONS
Wilhelm Hachtel, Niederstetten, Germany, assignor to Rudolf Storzbach, Stuttgart, Germany
Filed July 15, 1964, Ser. No. 382,789
Claims priority, application Germany, July 16, 1963, St 20,861
18 Claims. (Cl. 16—96)

This invention relates to curtain rails, and more specifically to a curtain rail, preferably of synthetic plastic material, having curved end sections and to the method of making the same.

Curtain rails of synthetic plastic material having a straight middle section and curved end sections have heretofore been manufactured by making the straight middle section from an endless piece produced in an extrusion process and the curved end sections separately, for example, by cutting them from solid material. When assembling such rails the straight middle section, cut to the desired length, had to be connected with the end sections in a highly complicated manner.

It is the object of the present invention to improve the known method by producing the entire curtain rail in an injection molding process, thus eliminating the difficulties arising from the connection of an extruded part with parts made in a different way.

According to one feature of the invention, the curtain rail is composed of an upper part and a lower part, the connected surfaces of said parts lying in a plane extending substantially parallel to the plane of the curtain rail. This measure facilitates the production of channels adapted to receive runner rollers or slide members to which a curtain may be attached through the intermediary of curtain support members.

According to another feature of the invention, either of the parts of the curtain rail having a straight middle section and two curved end sections may be made in one piece.

According to a further feature of the invention, however, either of the parts of the curtain rail may have a middle section composed of at least one part of a desired length and initially separate curved end sections. This latter construction will facilitate the manufacture of the curtain rails in cases where it is desired to have middle sections and end sections in a variety of lengths and shapes.

According to a still further feature of the invention, the upper part and the lower part of the curtain rail are interconnected by alternating grooves and tongues and fixed to one another by screws or adhesive means.

Several embodiments of the invention are illustrated by way of example in the accompanying drawings, in which:

FIG. 1 is a bottom view of a curtain rail according to the invention, made in one piece;

FIG. 2 is a similar but exploded view of a curtain rail having a detachable middle section;

FIG. 3 is a bottom view of a curtain rail having a middle section composed of a number of elongated members;

FIG. 4 is a rear view of FIG. 3 showing a curtain rail consisting of an upper part and a lower part, each of said parts being composed of a different number of elongated members;

FIG. 5 is a bottom view, on an enlarged scale, illustrating connecting means between one of the curved end sections and the middle section of the type shown in FIG. 2;

FIG. 6 is a longitudinal cross-sectional view of the connecting means shown in FIG. 5;

FIG. 7 is a similar but exploded view;

FIG. 8 is a cross section illustrating the two-part construction of the curtain rail;

FIG. 9 is a bottom view of a curved end section and part of a middle section in a modified embodiment;

FIG. 10 is a bottom view of an auxiliary section for the curved end section shown in FIG. 9;

FIG. 11 is a similar view of the curved end section shown in FIG. 9 and the auxiliary section of FIG. 10 attached thereto;

FIG. 11a is a bottom view of a fixation means for the end of a curtain;

FIGURE 11b is a vertical sectional view of said fixation means.

FIG. 12 is a cross sectional view of the assembly shown in FIG. 11;

FIGURE 12a is an end view of the assembly of FIGURE 11.

FIG. 13 is a bottom view of a combined curtain rail having a curved section and a straight auxiliary rail;

FIG. 14 is a similar view of an end member of the straight auxiliary rail shown in FIG. 13;

FIG. 15 is a cross section taken on the line XV—XV of FIG. 13 showing the curved section and the end member of the straight auxiliary rail;

FIG. 16 is a bottom view of a modified form of curved section with an angular attachment member;

FIG. 17 is a plan view of the angular attachment member;

FIG. 18 is a top plan view, partly broken away, of a modified form of curved section separable in length and width;

FIG. 19 is a cross section through FIG. 18;

FIG. 20 is a sectional view illustrating connecting means at the ends of the curved section shown in FIGS. 18 and 19 for connection with adjacent sections, and FIG. 21 is a top plan view illustrating an example of how the curved sections shown in FIG. 18 may be disassembled.

FIG. 1 shows a curtain rail 1 as proposed by the invention which substantially consists of a straight rail section terminating into curved end sections and is made entirely in an injection molding process. It is desirable to produce just one standard rail made in one piece by injection molding and having a customary minimum length of e.g. 110 to 150 cm. If greater lengths are required it is advantageous to produce, as shown in FIG. 2, by injection molding two separate rail sections 2 and 3, each of said sections corresponding in shape and size, for example, to one half of a standard rail. A usually straight middle section 4, which has also been made separately by injection molding, may be inserted between the rail sections 2 and 3 serving as end sections.

FIG. 2 also shows that a projecting connecting tongue 5 is formed on each of the end faces of the middle section 4 and of the end sections 2 and 3 abutting each other in assembled state, said tongue 5 being disposed substantially centrally of the rail width between the running grooves formed therein to receive portions of the curtain support members. As can be seen from FIGS. 6 and 7, each connecting tongue 5 is formed as a stepped off portion having substantially half the thickness of its related rail section 2, 3 or 4. A recess 6 is formed at the end face of the adjacent rail section, opposite the connecting tongue 5 to receive said tongue 5 so that, in assembled state, adjacent rail sections overlap each other in the region of their tongues 5. In the embodiment shown in FIG. 2 the connecting tongues 5 are, in top plan view, of semi-circular configuration, and so are the recesses 6 which are designed to receive said tongues. Although the rounded off shape of the tongues and recesses seem to facilitate the interengagement of the sections, tongues and recesses of polygonal shape may, of course, also be used.

As shown in FIG. 6, the portions of the rail sections overlapping each other are fixedly connected by a screw 7 extending through said overlapping portions substantially centrally thereof, the screw 7 being screwed in or passed through the material and fixed by a nut (not shown). In the region around the screw head a circular bead 8 or a polygonal bead $8^1$ may be provided to cover the external joint around the tongue and to reinforce the outer tongue.

When it is desired to use the same end sections 2 and 3 in curtain rails of various lengths, the middle sections are preferably produced in lengths of, for example, 10 cm. or a multiple thereof, that is 20, 30, 40 . . . 100, 110, 120 centimeters and so on, according to requirements. In the production of the middle sections, this may be achieved by using a basic mold which is divided intermediate the ends of the middle section to be formed and forms the end portions of the middle section including the connecting tongues 5, whereas corresponding mold parts are inserted between the inner ends and connected with the end portions of the basic mold to form a rigid mold unit.

To facilitate the production of running surfaces 9 and channels 10 adapted to receive runner rollers or slide portions of the curtain supporting members, every rail section 2, 3 or 4 is composed of an upper part 11 and a lower part 12, as can be seen from FIG. 8, the plane between the two parts extending substantially parallel to the plane of the curtain rail. The connected surfaces of the two rail parts 11 and 12 are provided with alternating grooves and tongues 13 and 14 to ensure accurate assembly of the two parts.

The upper part 11 and the lower part 12 are each formed advantageously by injection molding in one piece, webs or coverings 15, indicated in dashed lines in FIG. 8, serving only as auxiliary means in the injection molding process, will afterwards be cut off for the formation of running grooves 16. Of course, the lower parts 12 might also be made by injection molding in several parts or sections laterally defining the running grooves.

As shown in FIG. 2, screws 17 are distributed along the length of the curtain rail to fixedly connect the upper part 11 with the lower part 12. The screws 7 at the abutting end faces of the rail sections 2, 3 and 4 are also used to hold the two parts 11 and 12 together and may in addition be utlized for fixation of the curtain rail on a ceiling. The upper parts 11 as well as the lower parts 12 of the three rail sections 2, 3 and 4 are, in the embodiment shown, interconnected at their end faces by means of the connecting tongues 5 and the recesses 6 described above.

Between the upper and lower parts of the curtain rail composed of middle and end sections a reinforcing metal strap 18 is inserted, for example in a recess formed in the advantageously thicker upper part 12, which strap 18 extends at least over the straight portions of the rail sections and preferably also across the butt joints to improve the connection between the several rail sections.

On the lateral longitudinally extending surfaces of the curtain rail, either on the upper part thereof as shown in FIG. 8 or on the lower part (not shown), ledges 19 and 20 are formed which may have an outwardly widening shape, for example, of the trapezoidal or dovetail type. The ledge 19 serves to be engaged by a correspondingly grooved attachment member 21 for a blind 22 usually provided. The blind 22 has grooves to slidably receive a cover plate 23 as indicated in dot and dash lines in FIG. 8.

The other ledge 20 may be provided with or connected to a flexible lip 24 adapted to resiliently bear against the room ceiling.

It will, of course, be possible to insert between the two end sections 2 and 3 a middle section made up of several longitudinal sub-sections which are connected to each other, for example, by connecting tongues and recesses as described above. In this arrangement the middle section of the upper part 11 may be composed of a smaller number of sub-sections than the lower part and vice versa. Also the length of the end sections 2 and 3 may vary between the upper and lower parts of the rail. In this manner, in assembled state of the curtain rail, the joints between adjacent rail sections in either part of the curtain rail will be displaced relative to those in the other part, thus increasing the rigidity of the curtain rail so that in some cases reinforcing inserts may be dispensed with. FIG. 4 shows a curtain rail of this kind in which the upper part 11 consist of two straight sub-sections 25, 25 and curved end sections 26, 26, while the lower part 12 is composed of three straight middle or sub-sections 27, 27, 27 and two curved end sections 28, 28.

FIG. 9 shows part of a middle section 29 of a curtain rail followed by a curved section 30 which may, as in the embodiments heretofore described, serve as an end section of the curtain rail. To hold the curtain rail at a relatively great distance from the wall the end section 30 may have a straight extension 31 which at the same time serves as a side cover for the curtain rail and may be cut off to any length required. The extension 31 may be of such a length as to form a side portion extending, for example, at an angle of 90° relative to the front portion of the rail and which may serve, for example, to support a curtain portion extending around a corner.

While the curved end sections of the curtain rail shown in FIGS. 2 and 3 have a uniform width along their entire length, the curved section 30 has according to FIG. 9 a width tapering towards the end or towards the extension 31, respectively, the latter maintaining the same width throughout its length. This particular shape of the curved section results in a substantial saving of space and material.

The curtain rail shown in FIG. 9 has only one running groove 32 in the lower part, which groove in the end region of the curved section 30 has an aperture 33, as is usually provided for the insertion of a curtain, and thereafter, as indicated $32^1$, continues into the extension 31. The opening 33 may be closed by a simple stopper or, as indicated in FIG. 11, by a special fixation plug 34 which serves as a simple closure but at the same time may serve to fix the curtain end in position. Such a fixation plug 34, designed as a rotary body, is shown in FIG. 11a in bottom view turned through 90°, and in FIG. 11b in an axial vertical sectional view. This plug 34 consists of a cylinder having a rectangular cavity 35, a portion of the cylinder wall defining said cavity being cut out to form a slot 36. The plug 34 is disposed between a plate 37 having ribs 38 and forming the upper part of the curtain rail as shown in FIGS. 12 and 12a, and a plate 39 constituting the lower part of the curtain rail and having grooves 40 in which free edges of said ribs 38 are inserted and fixed by adhesive means. By means of a collar 41 at its underside, which may if desired be supplemented by a pivot on its upper side, the plug 34 is rotatably mounted in the aperture 33 of the lower curtain rail part. When in the position indicated in FIG. 11, the plug 34 allows a curtain support member 42, as indicated in dot and dash lines in FIG. 11b to be slipped over from the running groove 32 into the cavity 35 of the plug. Here a runner roller or slide piece 43 of the curtain support member 42 comes to lie over a step-like or tooth-shaped internal stop projection 44 protruding from the wall of the plug 34 into the cavity 35. The stop projection 44 has a groove or recess 45 extending in the longitudinal direction of the plug 34 and engaged by a leg 46 of the curtain support member 42. By turning the fixation plug 34 through about 90° to a position in which its slot 36 is opposite the edge of the inserting aperture 33, the support member 42 is secured against disengagement from the plug and rail.

To facilitate turning of the plug 34 two diametrically opposite notches 47 are provided which allow a coin or screwdriver to be inserted.

As shown in FIGS. 12 and 12a, three hollow spaces are defined by the ribs 38 in the curtain rail. In the region of the central one of said spaces the running groove 32 is cut in the plate 39 of the lower rail part. The two other spaces accommodate a small socket or tubule 48 extending from the plate 37 of the upper part of the curved section 30 in a direction substantially perpendicular to the main surface of the plate 37. A pin 49 on the plate 39 of the lower part of the curved section is made to engage in said socket 48 to facilitate the accurate fittting together of the upper and lower rail parts and also to make the whole structure more rigid.

In this form of construction it is, of course, also possible to provide the ribs 38 and/or the sockets 48 on the lower part of the curtain rail and the grooves 40 and/or the pins 49 on the upper part.

To attain a snug connection between the middle section 29 and the curved section 30 the latter, for example, has its end to be connected so designed that in a region b, as indicated in FIGS. 9 and 11, the plates 37 and 39 of the upper and lower parts have an internal thickness which allows the curved section and the middle section to be pushed one into the other, in the manner of a groove and tongue connection, and then glued together in the overlapping region b. To this end the thickness of the plates of the upper and lower parts of the middle section is correspondingly reduced by external cutting.

As is also shown in FIG. 12, the plates 37 and 39 of the upper and lower part, respectively, have flanges 50 projecting beyond the extreme ribs 38 at the outer and inner edges of the curtain rail. These flanges 50 are of a progressively increasing thickness toward their free ends, for example, in the manner of a dovetail, with the thickened end portions of opposite flanges on the upper and lower parts facing each other. This arrangement allows initially narrow rails to be made wider by attaching an auxiliary section 51 to one side of the rail.

FIG. 10 shows such an auxiliary section 51 to be attached to the outer side of the curved section 30 shown in FIG. 9. The inner side of the auxiliary section 51 is curved in correspondence with the outer side of the curved section to be widened. As is shown in FIGS. 12 and 12a, the auxiliary section 51 also consists of an upper part plate with ribs and a lower part plate with grooves and has at its inner edge to be attached to the outer edge of the curved section 30, stepped off a short distance from its upper and undersides, respectively, flanges 52 which are likewise thickening toward their free ends but in such a manner that the thickened end portions of opposite flanges on the upper and lower parts are directed away from each other. Thus, when attaching the auxiliary section to the curtain rail, the outwardly directed thickened flange portions of the auxiliary section 51 engage behind the inwardly directed thickened portions of the flanges 50 of the curtain rail so as to establish a firm connection, as will be readily apparent from FIGS. 11, 12 and 12a.

At the outer side of the auxiliary section 51 outwardly widening projections 53 and 54 of various shapes are provided which may serve to support a curtain blind or an intermediate attachment member for such blind and the like.

An auxiliary section of the same type may be attached also to the middle section 29 of the curtain rail and the interconnection of adjacent auxiliary sections will be accomplished in the same manner as in the case of the different sections of the curtain rail itself.

FIG. 13 shows a middle section 55 having three running grooves 56, 57 and 58 and followed by a curved section 59 with an extension 60, 60¹ serving respectively as a distance piece or a side portion of the curtain rail. The connection between the middle section and the curved section is the same as in the embodiments illustrated in FIGS. 9 to 12. The central running groove 57 continues only a short distance into the curved section 59 and terminates at an introduction aperture 61, while the two outer grooves 56 and 58 continue on the extension 60, 60¹ beyond introduction apertures 62 and 63, respectively, at the transition between the curved portion of section 59 and its straight extension 60, 60¹. The introduction apertures 61, 62, 63 may again be designed for the insertion of simple stoppers or of fixation plugs 34 as described above.

Seeing that the number of running grooves has decreased from three to two, the curved section 59 is tapering in width toward the extension 60, the latter being of the same uniform width throughout its length.

To allow the rail assembly 55, 59 also to be widened by an auxiliary section 51, as shown in FIGS. 9 and 11, it is provided with lateral connecting flanges 66 on its outer side as shown in FIG. 13. When it is desired to suspend from a curtain rail of the type described a greater number of curtains than originally provided for, a self-contained straight insert rail may be used.

Such an insert rail, as indicated in FIGS. 13 and 14, consists of at least one middle section 64 carrying at its ends end sections 65. The middle and end sections are interconnected, for example, in the same manner as described with reference to FIGS. 9 to 12, i.e. by glueing together end flanges 66 which interlock in the manner of grooves and tongues. This insert rail 64, 65 is inserted in the free space between the curtain rail 55, 59 and extensions 60 at both ends thereof and held in position by interengaging flanges 67, 68, as shown in FIG. 13, having thickened end portions of the dovetail or groove and tongue type and which may be similar to the flanges 50 and 52 described in connection with FIG. 12.

The insert rail 64, 65 as shown has five running grooves 69, 70, 71, 72, 73 and each of the two extreme pairs of grooves 69, 70 and 72, 73, respectively, terminates in a common introduction aperture 74 and 76, respectively, while the central running groove 71 merges into a separate introduction aperture 75. Of course, the arrangement of the grooves may also be such that, for example, each running groove has an introduction aperture of its own, or the like. The introduction apertures 74, 75, 76 of the insert rail 64, 65 are likewise closed by fixation plugs 34. The insert rail 64, 65 is also composed of an upper part and a lower part connected together by ribs and corresponding grooves as shown in FIG. 15. When it is desired to diminish the width or decrease the number of running grooves in a given rail, certain portions of such rail may be cut off along lines indicated at 77 and 78 extending parallel to the internal ribs.

It is often desirable to have the ends of the front rail portion angular instead of curved. To this end, in order to dispense with special makes, angular attachment members 79 may be mounted on the outer side of the curved sections that are normally used and therefore always on stock. Such an angular attachment member 79 is shown in FIG. 16 in connection with a rail having a middle section 80 and a curved section 81. The angular attachment member 79 has the thickness of the normal curtain rail and like this consists of plate-shaped upper and lower parts which are interconnected through the intermediary of lateral walls of the attachment member preferably by glueing. The outer contour line of the angular attachment member 79 forms a right angle with rounded off corner and is in alignment with the adjacent straight parts of the curtain rail. The inner contour line extends along a curvature corresponding to the outer curvature of the curved section 81. The upper and lower plate-shaped parts of the attachment member 79 have along the inner curved edge a stepped off portion 82 of reduced thickness by means of which the attachment member 79 may be inserted between flanged edges 83 of the curved section 81, in the manner of a groove and tongue connection, and fixed in position by adhesive means. On the outer side of the angular attachment member 79 similar flanged edges are provided as on the rail for the insertion of a blind or the like.

An aperture 84 is advantageously provided in the lower plate-shaped part of the angular attachment member 79 to receive the collar of a fixation plug 34 described above, which plug 34 is placed in position prior to the glueing together of the angular attachment member. When it is desired to have a curtain front extending on a straight line or at a right angle around a corner, the curtain support member fastened at or near the extreme curtain end is introduced in the plug 34 from the outside in axial direction, this being made possible by the resiliency of the legs of the hook-shaped support member. By turning the plug the support member is then held in fixed position. The curtain rail itself may have one or several running grooves which may be arranged as desired and the width of the curved section may be uniform throughout or, as shown in FIG. 16, diminishing toward the end.

For many purposes, for example, in the case of bays having walls meeting at an obtuse angle, it may be desirable to adapt the course of the curtain rail to the corners and bends of the walls by inserting between the straight rail portions curved sections the legs of which define an angle other than of 90°. FIG. 18 shows a curved section 85 which may be readily adapted to all angles of up to 90°. As can be seen from FIG. 18, the curved section 85, which is defined at its inner and outer sides by arcs of a length of 90°, has preferably at its underside thin lines 86 dividing the arc into 90 individual degrees. These lines 86, which may be depressed or upstanding, extend in radial direction through the entire width of the section 85 toward the center of the arc. This arrangement allows the curved section 85 to be cut off at precisely the desired angle and without the use of a special measuring device.

As can be seen from FIG. 19, the curved section 85 likewise consists of a plate-shaped upper part 87 and lower part 88 one of which, e.g. the upper part 87, has ribs 89 which engage in groove 90 in the other part and are fixed therein by adhesive means. The ribs 89 and grooves 90 extend parallel to the arcs defining the contour of the curved section 85. End flanges 91 projecting from the curved section 85 at both ends thereof are formed by diminishing in stepped off fashion the thickness of the upper and lower plate-shaped parts at their inner sides at a region that is free from ribs. By means of these flanges 91 the curved section 85 can be slipped on to the end face of an adjacent rail section of correspondingly reduced thickness and fixed thereon by adhesive means.

To reduce the curved section 85 to fit angles smaller than 90°, the central part of the section 85 will be cut out to such an extent that the remaining two extreme parts together give the desired length of arc. As shown in FIG. 21, the individual extreme parts thus obtained are then provided with connecting studs 95 which are curved in correspondence with the curvature of the section 85 and are adhesively fixed in recesses formed between adjacent ribs 89. These connecting studs 95 are introduced with their free ends in similar recesses formed in the adjacent part to be connected and may be secured therein by adhesive means or by the cooperation of apertures 96 and transverse pins 97, the latter being shown in FIG. 19. In this manner the end connecting flanges 91 are preserved for the connection to adjacent rail sections.

As can be seen from FIG. 19, the longitudinal ribs 89 are distributed in such a manner that between every two ribs a recessed groove 92 is formed in the inner side of plates 87 and 88 of the upper and lower parts, respectively. These grooves 92 form intentional breaking lines or, in the case of the lower plate 88, serve for the provision of running grooves to be cut therefrom. To this end the distances between the individual ribs 89 are so chosen as to correspond to the normal distances between the running grooves of the curtain rail. This allows rail sections having one or several running grooves to be connected together with the curved section 85 and to continue in the latter the running grooves from the rail sections along desired lines.

The curved section 85 is originally made of such a width, in the embodiment shown in FIG. 19 up to eleven running grooves might be provided, that it may be readily adapted to any or most of the commonly used rail widths by simply cutting off the excessive portion in the form of a curved strip running parallel to the loingtudinal ribs 89.

As can further be seen from FIG. 19, the curved section 85 likewise has at its outer and inner edges projecting flanges 93 having thickened or stepped off portions or the like for the attachment of a blind or a blind support or any other attachment member.

It will be understood that the embodiments heretofore described with reference to the drawings may, of course, be highly modified in details or combined with each other without departing from the scope of the invention as claimed. Thus, for example, any suitable material other than synthetic plastic material, e.g. metal such as aluminum, may be used in the manufacture of the curtain rail.

I claim:

1. A curtain rail of molded synthetic plastic material comprising a straight middle section and curved end sections, each of said sections being defined by upper and lower parts, a longitudinal chamber disposed between said upper and lower parts, each longitudinal chamber being defined by a lower boundary surface of the upper part, spaced side surfaces and adjacent running surfaces of the lower part, said adjacent running surfaces being spaced to define a running groove, said upper and lower parts being made separately from each other by injection molding, said upper and lower parts having interlockingly engaged ribs and grooves for maintaining said upper and lower parts, chambers and running grooves of said sections in proper alignment, and connecting means firmly connecting said upper and lower parts together.

2. The curtain rail as defined in claim 1 wherein the straight and curved sections of the upper and lower parts are of a one-piece construction.

3. The curtain rail as defined in claim 1 wherein the upper and lower part of each curved end section is of a one-piece construction.

4. The curtain rail as defined in claim 1 wherein the upper and lower part of each curved end section is of a one-piece construction, and the upper and lower part of the straight middle section is of a one-piece construction.

5. The curtain rail as defined in claim 1 wherein the straight middle section is constructed from a plurality of separate portions.

6. The curtain rail as defined in claim 1 wherein the upper and lower parts of the sections have abutting end portions, the abutting end portions of the upper parts being in overlapped relationship to the abutting end portion of the lower parts, and means for fastening said end portions in said overlapped relationship.

7. The curtain rail as defined in claim 1 wherein one of said upper and lower parts includes a web of a predetermined thickness joining said ribs, and said ribs are of a thinner construction than that of said web.

8. The curtain rail as defined in claim 1 wherein one of said upper and lower parts terminates in marginal flanges along lateral longitudinal edges thereof to which other parts are adapted to be attached.

9. The curtain rail as defined in claim 1 wherein said rail includes inner and outer lateral edges, an insert rail disposed adjacent said inner lateral edge, said insert rail being defined by upper and lower parts, a longitudinal chamber disposed between said last-mentioned upper and lower parts, and a running groove is provided which opens into said last-mentioned chamber.

10. The curtain rail as defined in claim 1 wherein said curved end sections have outer lateral edges, an angular attachment member conforming to the configuration of each of said lateral edges for changing the outer contour of the end sections, and said attachment member being constructed from individual upper and lower parts.

11. The curtain rail as defined in claim 1 wherein the curved end sections define an arc length of approximately 90 degrees, a plurality of weakening means for selectively removing portions of the curved end sections to reduce the arcuate length thereof, and means for forming running grooves in the curved end sections upon the removal of portions thereof by said weakening means.

12. The curtain rail as defined as claim 1 wherein said end sections are provided with apertures for introducing curtain support members into said running grooves, a cylindrical plug insertable into each of said apertures between the upper and lower rail parts, said plug having an axial slot opening through its periphery for the insertion of curtain support members.

13. A curtain rail of molded synthetic plastic material comprising a straight middle section and curved end sections, said curtain rail being formed of upper and lower parts, at least one chamber disposed between said upper and lower parts, a running groove in said lower part opening into said chamber, said upper and lower parts being made separately from each other by injection molding, said upper and lower parts having interlockingly engaged ribs and grooves for maintaining the upper and lower parts in proper aligned relationship, said upper and lower parts being constructed from a plurality of pieces having adjacent end portions, means connecting said adjacent end portions to each other, said connecting means being defined by a boss on one piece received in a recess of an adjacent piece, and means maintaining said bosses and recesses in assembled relationship.

14. The curtain rail as defined in claim 13 wherein said bosses and recesses are of complementary polygonal configuration.

15. The curtain rail as defined in claim 13 wherein the adjacent pieces of the upper and lower parts are in abutting relationship, and the pieces of the upper parts are offset from the pieces of the lower parts whereby the upper and lower parts are in overlapped offset relationship.

16. The curtain rail as defined in claim 13 including a reinforcing member sandwiched between said upper and lower parts.

17. The curtain rail as defined in claim 13 wherein said rail includes inner and outer lateral edges, an insert rail disposed adjacent said inner lateral edge, said insert rail being defined by upper and lower parts, a longitudinal chamber disposed between said last-mentioned upper and lower parts, and a running groove is provided in said lower part which opens into said last-mentioned chamber.

18. The curtain rail as defined in claim 17 wherein each of said upper and lower parts is formed of at least two interconnected pieces.

References Cited

UNITED STATES PATENTS

| 2,350,689 | 6/1944 | Long | 16—96 |
| 2,457,491 | 12/1948 | Ramsey | 16—96 |
| 3,023,450 | 3/1962 | Renner et al. | 16—87.6 |

FOREIGN PATENTS

| 590,751 | 1/1934 | Germany. |
| 693,735 | 7/1940 | Germany. |
| 1,041,663 | 10/1958 | Germany. |
| 1,129,668 | 5/1962 | Germany. |
| 1,157,358 | 11/1963 | Germany. |
| 545,742 | 6/1942 | Great Britain. |
| 814,505 | 6/1959 | Great Britain. |

MARVIN A. CHAMPION, *Primary Examiner.*

EDWARD C. ALLEN, *Examiner.*

J. H. McGLYNN, *Assistant Examiner.*